United States Patent Office 2,825,329
Patented Mar. 4, 1958

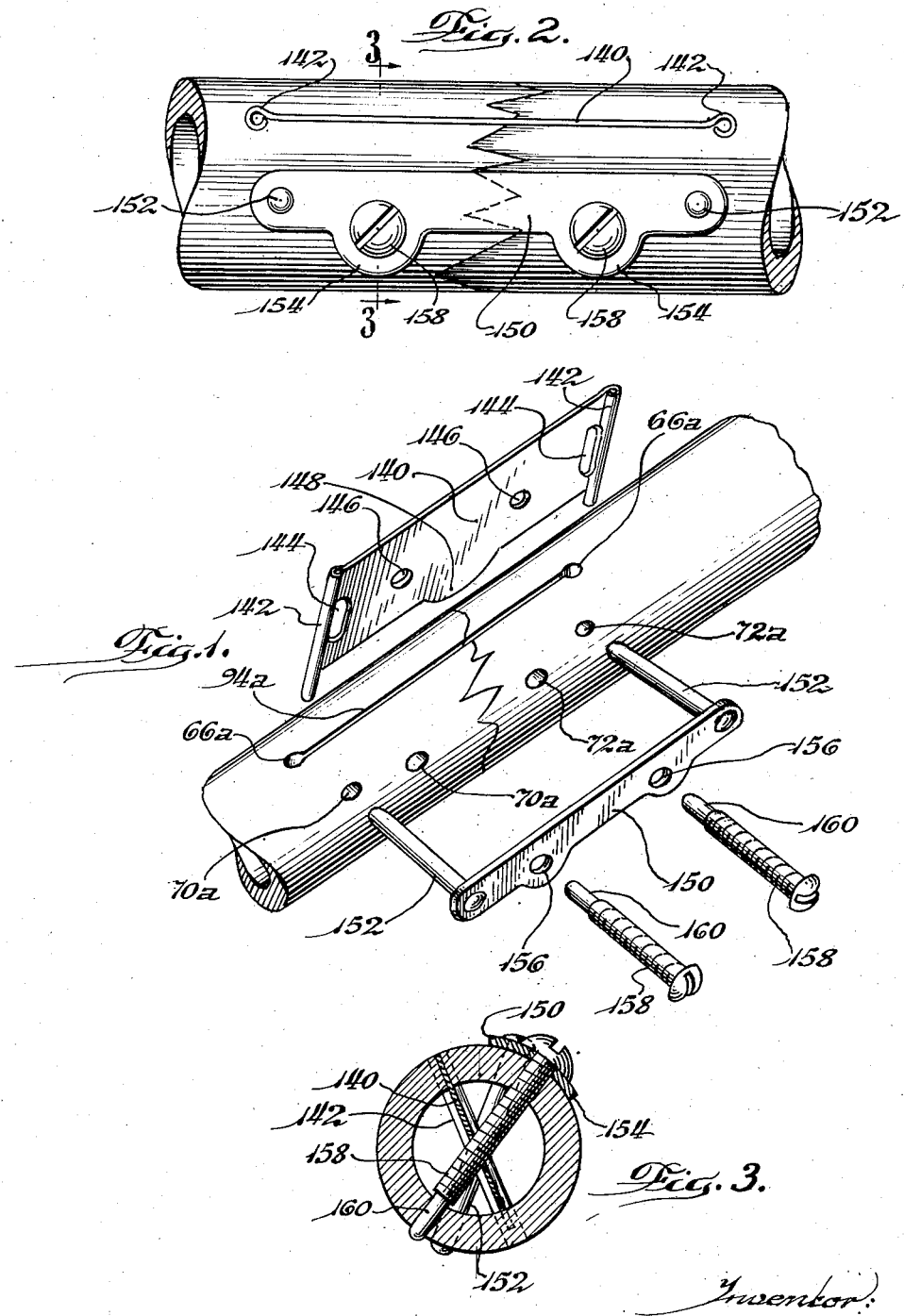

2,825,329

INTERNAL FIXATION OF FRACTURES

Orville S. Caesar, Barrington, Ill.

Application February 4, 1953, Serial No. 335,065

10 Claims. (Cl. 128—92)

The present invention relates to the internal fixation of fractures particularly of the large bones, such as the femur for instance. The invention contemplates novel metal elements which are left within the body to obtain fixation.

Internal fixation of fractures has been practiced for some time, and a variety of techniques have been used for this purpose. In general the object is to use plates, screws, rods and other elements for obtaining fixation within the body. One objection to most of the currently used techniques is that the internal fixating elements undesirably apply considerable pressure to the bone. Some methods also require the exposure of considerable bone and may therefore bring about too great an impairment of the blood supply.

One of the objects of the present invention is to avoid these disadvantages commonly associated with internal fixation by providing a novel arrangement of metallic parts for holding the bone ends in positive alignment by preventing any relative movement in a transverse, torsional or bending manner and which accomplishes this without putting undue, abnormal pressure upon the bone surface at any location.

Still another object is to provide fixation members and instruments which largely free the surgeon from the necessity of exercising such a high order of mechanical skill as is ordinarily required in surgery of this character.

Yet another object is to provide a novel method for obtaining internal fixation.

Other objects and advantages will become apparent from the following description of a preferred embodiment of my invention which is illustrated in the accompanying drawings.

In the drawings, in which similar characters of reference refer to similar parts throughout the several views:

Fig. 1 is an exploded perspective view showing the bone fixation elements which remain within the body, illustrated radially outwardly from their final location;

Fig. 2 is a top view of the bone fixing members in final position; and

Fig. 3 is a transverse sectional view which may be considered as taken in the direction of the arrows substantially along the line 3—3 of Fig. 2.

According to the present invention, the fracture is reduced and the bone ends temporarily clamped in place. The bone is then prepared to receive the internal splint in the manner best seen generally in Fig. 1. A bone drill is used to form three sets of parallel holes extending through the bone transversely as will be described presently. For this purpose I prefer to use a jig or fixture clamped to the bone for guiding the drill in order to insure precise placement.

In any event, a pair of holes 66a is drilled in parallel relation, one on each side of the fracture, transversely through the bone. A second set somewhat closer together, indicated at 70a, is then drilled in parallel relation and at an angle of about 60 degrees to the first set. The third set, 72a, still closer together, is drilled at an angle of somewhat more than 60 degrees to the first set 66a so as to be slightly beyond the second set 70a.

All three sets of holes pass all the way through the bone, and the set 72a is enlarged on the near side. This enlargement is such that when screws are passed through these holes, the near side will have approximately the thread diameter of the screws while the far side will be at approximately the root diameter.

A circular bone saw is then used to form a longitudinal slot 94a. This saw cut removes the material between the holes 66a on the near side of the bone and the saw blade is advanced far enough to form an arcuate notch internally at the far side. This notch should not break through the surface of the bone at the far side.

By referring now to Figs. 1 to 3, wherein I have illustrated the internal fixation elements or splints, it will be seen that one of these is a flat, stiff plate 140 formed of a metal of an alloy which may permanently be permitted to remain within the body. The plate 140 has a thickness only slightly less than that of the slot 94a and is formed at each end to provide pins 142. These pins and the remaining portion of the plate may be formed as a casting, or, if desired, the pins may be shaped by rolling the ends of the plate 140 as shown. Just how these pins are formed will depend principally upon the character of the metal employed, some metals for such purposes being rather brittle and hard, and better suited to casting processes than bending and shaping processes. In any event, the pins 142 are parallel to each other and are of such size and have such alignment that they fit the holes 66a when the intermediate portion is in the slot 94a.

Just inwardly of the pins 142 the central portion of the plate 140 is cut out as indicated at 144, the openings 144 having a spacing equal to the distance between the holes 70a. Still closer to the center, the plate 140 is drilled and tapped with openings 146 in alignment with the holes 72a. This drilling and tapping is not conducted normal to the face of the plate 140, however, but is at an angle of about 60° thereto for a purpose which will appear presently. The lower edge of the plate 140 may have a small arcuate tab 148 at its center, which has the same degree of curvature as the notch previously mentioned as being formed by the saw blade.

The plate 140 is put in place simply by entering the ends of the pins 142 into the holes 66a and pressing or gently tapping the plate into place until the top surface is substantially flush with the surface of the bone. Under these circumstances the tab 148 will enter into the notch formed at the far side of the bone by the center of the saw blade. In order to insure this, the plates 140 may be made in slightly different sizes to accommodate bones of different thicknesses.

A second plate consists of a strip of metal of appropriate composition indicated by the numeral 150 which preferably is heavier and stiffer than the plate 140. This strip 150 is riveted at its ends to a pair of pins 152 which are parallel and spaced apart the same distance as the spacing between the holes 70a. The strip 150 also has a pair of tabs 154 formed at one edge which are drilled and tapped with openings 156 in alignment with the holes 72a.

This member is inserted by entering the pins 152 in the holes 70a and passing or tapping the plate 150 into position against the bone, under which condition the holes 156 are in alignment with the holes 72a. A pair of screws 158 are threaded into the openings 156 and run down with any suitable screw driver until their heads are jammed against the top surface of the plate 156. The outer ends of these screws are turned down as indicated at 160 to their root diameter or slightly therebelow so that they are smooth.

By referring particularly to Fig. 3 it will be seen that when the pins 152 are entered in the openings 70a and the plate 150 pressed into place, these pins 152 pass through the openings 144 in the plate 140, and when the plate 150 is against the bone surface, the ends of the pins 152 indicated at 153 just project from the opposite side of the bone. The screws 158 after being threaded into the openings 156 pass through the bone openings 72a freely inasmuch as these openings are preferably drilled out enough to just provide clearance. When the screws are approximately half way down to their final positions, the turned down ends 160 will enter the threaded openings 146 of the plate 120. As each screw advances, it will bring the thread at its end against the plate 146 and in something less than one turn of the screw the screw threads will enter the threads in the opening 146. Thereafter the screw can be driven home without any relative motion taking place between the plates 150 and 140. The other screw 158 is of course driven into poistion in a similar fashion and with a similar result. When finally located, the smooth ends 160 of the screws just project from the far side of the bone as seen in Fig. 3.

By using this fixation technique, the screws are not threaded into the bone substance and therefore do not clamp the bone plate 150 against the surface of the bone so as to exert an undesirable pressure. In further explanation of this, note that inasmuch as the screw threads are started into the plate 140 while the plate 150 is held against the bone, and since these screws advance through both plates at the same rate, the final result is that when the heads of the screws 158 are jammed against the surface of the bone plate 150, this plate is retained in place solely by the plate 140. Inasmuch as there will almost always be some tendency for the screw 158 to stop moving inwardly for a portion of a revolution—until the threads have entered the threads 146—there can be no tendency for the plate 150 to be held against the surface of the bone with any greater pressure than the hand pressure exerted upon it by the surgeon at the time the screws 158 entered the plate 146 and almost always there will be a slight spacing due to the screws backing off a portion of a revolution.

As best seen in Fig. 3, the screws 158—being guided in the bone at both ends—prevent shifting of the plate 140. Likewise the plate 140 prevents withdrawal or movement of the screws 158 or plate 150. Twisting of the bone ends relative to each other is resisted by the stiff plate 150 and by the plate 140 and their pins. Bending likewise is impossible without bending of the plates 150 and 140. Endwise thrusts are also resisted by the pins 152 and plate 150 and also by the plate 140 and its pins 142. In addition, of course, the screws 158 give support to the bone to help prevent any relative movement.

After the screws 158 have been tightened, any clamp used for holding the bone ends in place temporarily is removed, thereby completing the permanent fixation. The fixation as thus accomplished is extremely strong, the placement of the internal fixing elements is sure to have a higher degree of accuracy than any other technique with which I am familiar, the elements do not place pressure upon the surface, and the completed joint is relatively smooth. Furthermore, as is apparent, the plates may be inserted without exposing much in excess of 60° of the bone.

From the above description of a preferred embodiment of my invention it will be apparent that variations and modifications may be made without departing from the scope or spirit of the invention. The scope of the invention is therefore to be measured by the scope of the following claims.

I claim:

1. Internal fracture fixation mechanism comprising a plate adapted to extend into a bone in one longitudinally extending plane substantially including the centerline of said bone, a pair of parallel pins adapted to extend into said bone in a second longitudinally extending plane intersecting said first plane at substantially the centerline of said bone, a bar connecting the outer ends of said pins, and screw means adapted to be threaded through said bar and plate for fixing the relative positions of said bar, pins and plate independently of the bone structure.

2. Internal fracture fixation mechanism comprising a plate adapted to extend into a bone in one longitudinally extending plane, two or more parallel pins adapted to extend into said bone, in a second longitudinally extending plane intersecting said first plane, a bar connecting the outer ends of said pins, and screw means adapted to be threaded through said bar and plate for fixing the relative relationship of said bar, pins and plate.

3. Internal fracture fixation structure comprising, in combination, a rigid generally flat plate adapted to extend into a bone slot crossing a fracture in the bone and adapted to lie substantially completely within the bone, the medial portion of said plate defining threaded openings therein spaced longitudinally along the plate, a pair of screws adapted to be threaded into said openings at a substantial angle to the plane of said plate, and a plate connecting the outer ends of said screws and adapted to rest alongside the external surface of the bone.

4. Bone fracture fixation means comprising, in combination, a generally flat plate adapted to be inserted into a slot extending across a fracture in a bone, said plate having transversely elongated enlargements on opposite ends thereof adapted to interlock with the bone at opposite ends of the slot, the transverse medial portion of said plate defining threaded openings therein longitudinally spaced along the plate, an elongated bar member adapted to lie along the external surface of the bone and extend beyond opposite sides of the fracture therein, said bar member defining threaded openings therein aligned with the respective threaded openings in said plate, and screw means extending through the aligned openings in said bar member and said plate to hold the latter members in fixed spaced relation to each other.

5. Internal fracture fixation mechanism comprising, in combination; first thin, generally flat, elongated plate means of tough inert material adapted to fit edgeways substantially completely within a fractured bone and extend across the bone fracture; second thin, elongated plate means of tough inert material structurally separate from said first mentioned plate means and adapted to lie principally outside the bone and in crossing relation to the bone fracture; said first plate means defining threaded holes in opposite ends thereof spaced a substantial distance from opposite longitudinal edges thereof, said second plate means defining threaded holes therein spaced therealong in alinement with said respective threaded holes in said first plate means, and screw means threaded through said alined threaded holes in both of said plate means for fixing the relative relationship of all three of said means independently of bone structure.

6. The method of fixing a fractured bone which comprises, reducing the fracture, clamping the bone on opposite sides of the fracture to positively hold the reduced fracture against misalignment while the bone is clamped, drilling holes in the clamped bone on opposite sides of the fracture, sawing a thin flat slot in the clamped bone at a steep angle to the surface of the bone and extending transversely across the fracture beyond opposite sides thereof to intersect at opposite ends the drilled holes in the bone; inserting into the slot a thin, flat plate of tough inert material; placing a second plate of tough inert material on the exterior surface of the bone to extend therealong beyond opposite sides of the fracture in covering relation to holes drilled on both sides of the fracture, extending connecting members through the drilled holes in the bone on opposite sides of the fracture to engage both plates and positively locking the connecting members to at least one plate, and unclamping the bone.

7. The method of fixing a fractured bone comprising the steps of reducing the fracture, clamping the bone on opposite sides of the fracture to positively hold the reduced fracture against misalignment while the bone is clamped, drilling holes in the clamped bone on opposite sides of the fracture, sawing into the clamped bone a narrow deep slot crossing the bone fracture at a steep angle to the exterior surface thereof, inserting a thin flat plate into the slot to extend across the fracture, applying a plate to the outer surface of the clamped bone to extend across the fracture and overlie holes drilled in the bone on opposite sides of the fracture, fixing the two plates together by extending screw means through the holes drilled in the bone and threading the screw means into both plates on opposite sides of the bone fracture to form a rigid spacing therebetween which is undiminished by tightening of the screws thus precluding the application of harmful pressure to the bone, and unclamping the bone for the first time subsequent to said clamping.

8. The method of fixing a fractured bone which comprises the steps of reducing the fracture, clamping the bone on opposite sides of the fracture to positively hold the reduced fracture against misalinement; maintaining the clamping action on the bone while drilling a pattern of holes into the bone on each side of the fracture, cutting into the bone a narrow slot extending at a steep angle to the bone surface between two similar drilled holes on opposite sides of the fracture, inserting into the slot a first thin flat plate and simultaneously interlocking enlargements on opposite ends of the plate with the drilled holes at opposite ends of the slot, applying a second plate of inert material to the bone to extend across the fracture therein, and fixing opposite ends of the two plates together by extending screws through drilled holes in the bone on opposite sides of the fracture to connect with the second plate and interlock with said first plate within the bone; and unclamping the bone.

9. Internal fracture fixation structure comprising, in combination; a thin, generally flat, elongated plate of inert material adapted to fit edgeways into and substantially completely within a bone slot crossing a fracture in the bone; said plate defining openings therethrough spaced longitudinally therealong and spaced transversely from opposite longitudinal edges thereof, a pair of rotary connecting members extending through said plate openings at substantial angles to the plane of said plate, a second thin plate of inert material extending between the outer ends of said connecting members and adapted to rest alongside the external surface of the bone, and said second plate and the adjacent outer ends of said connecting members including respectively releasable connecting means coacting to fix said plate and said members together.

10. Bone fracture fixation structure comprising, in combination, two structurally separate plates of rigid inert material having thin elongated forms adapting the plates to fit on a fractured bone in spanning relation to the fracture therein and in spaced relation to each other, said plates each defining threaded openings therein spaced longitudinally therealong in alinement with similar openings in the other plate, a plurality of elongated connecting members of rigid inert material extending rotatably through alined pairs of said openings in said respective plates, each of said connecting members having thread means spaced longitudinally therealong and interfitting threadedly with the adjacent threaded openings of said respective plates to positively hold the latter in a fixed relationship to each other, and each of said connecting members having abutment means thereon positively engaging one of said plates to firmly limit rotary movement of the connecting member in one direction.

References Cited in the file of this patent
UNITED STATES PATENTS

| 1,156,440 | Smith | Oct. 12, 1915 |
| 2,133,859 | Hawley | Oct. 18, 1938 |
| 2,455,655 | Carroll | Dec. 7, 1948 |
| 2,460,470 | Rogers | Feb. 1, 1949 |
| 2,557,364 | Treace | June 19, 1951 |
| 2,583,896 | Siebrandt | Jan. 29, 1952 |
| 2,658,508 | Gibson | Nov. 10, 1953 |

OTHER REFERENCES

The Journal of Bone and Joint Surgery for July 1944, page 460. (Copy in Scientific Library.)